United States Patent
Simrose

(12) 
(10) Patent No.: US 6,497,545 B1
(45) Date of Patent: Dec. 24, 2002

(54) UNDER FLOOR UNLOADING SYSTEM FOR A CROP STORAGE BIN

(76) Inventor: Philip D. Simrose, P.O. Box 69 Parkbeg, Saskatchewan (CA), S0H 3K0

(*) Notice: Subject to any disclaimer, the term of this patent is extended or adjusted under 35 U.S.C. 154(b) by 0 days.

(21) Appl. No.: 09/489,836

(22) Filed: Jan. 24, 2000

(51) Int. Cl.[7] .............................................. B65G 65/46
(52) U.S. Cl. ....................... 414/310; 414/306; 414/326; 414/808; 198/532
(58) Field of Search ................................ 414/304, 306, 414/308, 310, 318, 319, 325, 326, 327, 808; 198/532

(56) References Cited

U.S. PATENT DOCUMENTS

| | | | | |
|---|---|---|---|---|
| 3,064,831 A | * | 11/1962 | Cook .......................... | 414/310 |
| 3,107,825 A | * | 10/1963 | Reed .......................... | 414/326 |
| 3,155,247 A | * | 11/1964 | Patterson ..................... | 414/319 |
| 3,367,519 A | * | 2/1968 | Ferris et al. ................. | 414/310 |
| 3,563,399 A | * | 2/1971 | Shivers ....................... | 414/808 |
| 3,982,640 A | * | 9/1976 | Nauta ......................... | 414/310 |
| 4,015,734 A | * | 4/1977 | Laidig ........................ | 414/310 |
| 4,029,219 A | | 6/1977 | Rutten et al. | |
| 4,057,152 A | * | 11/1977 | Weaver ........................ | 414/310 |
| 4,146,145 A | * | 3/1979 | Easton ........................ | 414/310 |
| 4,529,085 A | * | 7/1985 | Johnson ....................... | 198/532 |
| 4,603,795 A | * | 8/1986 | Bonerb et al. ................. | 414/326 |
| 5,098,247 A | * | 3/1992 | Campbell ...................... | 414/326 |
| 5,318,444 A | | 6/1994 | Kuzub et al. .................. | 414/326 |
| 5,511,925 A | | 4/1996 | Muth .......................... | 414/310 |

* cited by examiner

Primary Examiner—James W. Keenan
(74) Attorney, Agent, or Firm—Adrian D. Battison; Michael R. Williams

(57) ABSTRACT

A crop material is unloaded from a storage bin by providing a generally triangular pit arranged below the base pad surface of the bin into which crop material can fall from the bin through one of two openings in the base floor. Opening the door of one of the openings at the center of the bin allows discharge of the material into the pit by gravity to an apex at a bottom of the pit below the opening. The pit has a bottom wall inclined upwardly and outwardly to exterior opening outside the bin. An auger standing outside the bin with an inclined auger tube is moved to a position extending downwardly from a top discharge end of the auger to a bottom feed end of the auger which is inserted into the pit through the exterior opening so as to extend to the apex at the bottom of the pit for extracting the material falling into the pit through the center opening. When the bin is emptied so that no more material flows into the pit, a second opening at the wall of the bin is opened thus emptying a path to the center from a door at the wall so that a bin sweep can be inserted to complete discharge of the material through the center opening. One part of the pit is covered by a perforated screen allowing injection into the bin of drying air from the pit.

18 Claims, 3 Drawing Sheets

FIG. I

UNDER FLOOR UNLOADING SYSTEM FOR A CROP STORAGE BIN

This invention relates to an under-floor unloading system for unloading the crops from a storage bin of a type which can be used for crops or other dry solid flowable materials.

BACKGROUND OF THE INVENTION

The storage of crop material is generally carried out in a storage bin which includes a vertical usually cylindrical wall mostly including a conical roof covering the top edge of the wall. The bin is generally mounted on a horizontal concrete pad or other suitable base to provide a proper support for the wall and so as to ensure that the crop material is supported on a suitable generally smooth surface from which it can be removed.

Various techniques have been proposed for emptying the grain bin. Conventionally an auger is inserted into the bin so as to extract the material and this discharges of the majority of the material without difficulty. However, the material adjacent the floor remains in place and must be discharged to allow complete emptying of the bin. For many years this was done by shovelling.

Some bins are currently mounted on conical hopper bottoms which discharge the material to a central discharge opening but these bottom structures raise the bin wall thus making the whole structure less stable and reducing the amount of material which can be contained.

In U.S. Pat. No. 4,029,219 (Rutten) assigned to P & D manufacturing discloses an under floor discharge system which includes a horizontal auger tube laid in a channel in the concrete base. The base therefore must be thicker to accommodate the tube which remains in place at all times. The auger flight is separate element which is inserted in to the tube when required and can be removed for use of the bins when necessary. The tube is filled from a central opening and the remaining material can be swept to the central opening by a rotating bin sweep.

This arrangement has the disadvantages that the concrete pad must be increased in thickness thus increasing cost, an additional auger structure is necessary for transporting material through the tube in the concrete which again increases the cost, and it is in many cases difficult to transport the bin sweep into the interior of the bin after an initial quantity of crop material is discharged since the crop material remains at a significant depth at the wall due to the angle of repose of the crop material.

U.S. Pat. No. 5,511,925 (Muth) issued Apr. 30, 1996 discloses a similar discharge system but in this case the discharge auger is mounted above floor level so that the sweep rotates underneath the discharge auger system. This arrangement has a significant disadvantage that it is relatively costly in order to provide the auger construction. The discharge auger has openings in the top surface storage to allow the entry of crop material both adjacent the center and the closer to the wall.

U.S. Pat. No. 5,318,444 (Kuzub et al) issued Jun. 7, 1994 discloses a discharge device in the form of a small dedicated auger which is inserted through a door in the wall of the bin and incline downwardly toward the center of the bin and carries its own bin sweep which rotates around the bottom of the discharge auger.

Again this constructions relatively expensive in view of the dedicated cost of the device.

SUMMARY OF THE INVENTION

It is one object of the present invention, therefore, to provide an improved bin for storage of dry flowable materials which is designed and arranged to allow easy ergonomic extraction of the material using a conventional discharge auger.

According to a first aspect of the invention there is provided a storage bin comprising:

a substantially horizontal floor pad defining a pad surface;

a bin wall arrangement mounted on the pad so as to stand upwardly therefrom and to define with the pad surface a container for a crop material;

a pit arranged below the pad surface into which crop material can fall from the container;

the pit having at least one container opening therefrom into the container, the at least one container opening having a door operable to be moveable from a closed position preventing discharge of material from the container through the opening into the pit to an open position allowing discharge of the material into the pit by gravity to a bottom of the pit below the container opening;

the pit having an exterior opening outside the container;

the pit being shaped for co-operation with an auger standing outside the container with an inclined auger tube extending downwardly from a top discharge end of the auger to a bottom feed end of the auger such that a bottom feed end portion of the auger can be inserted into the pit through the exterior opening and extend to the bottom of the pit for extracting the material falling into the pit through the container opening.

Preferably the bottom of the pit is below the exterior opening.

Preferably the bottom wall of the pit is inclined downwardly from the exterior opening to the bottom of the pit at an angle approximately equal to the angle of incline of the auger.

Preferably the pit is generally triangular in side elevational shape with a bottom apex such that a second bottom wall portion is inclined from the container opening downwardly and along the pit toward the exterior opening.

Preferably the exterior opening is generally horizontal.

Preferably the at least one container opening includes a first opening adjacent a center of the container and a second opening spaced along the pit adjacent the wall.

Preferably each of the first and second container openings includes a respective door separately operable to open and close the opening.

Preferably the wall includes an inlet door adjacent the second opening for insertion into the bin of a bin sweep.

Preferably the pit is covered between the first and second openings by a removable cover plate.

Preferably the removable cover plate is perforated to allow passage of air from the pit into the crop material.

Preferably the pit includes a removable hopper at a bottom apex for extraction of remaining crop material.

According to a second aspect of the invention there is provided a method for unloading crop material from a storage bin comprising:

providing a crop storage bin comprising:

a substantially horizontal floor pad defining a pad surface;

and a bin wall arrangement mounted on the pad so as to stand upwardly therefrom and to define with the pad surface a container for a crop material;

providing a pit arranged below the pad surface into which crop material can fall from the container;

providing at least one container opening from the container into the pit;

opening a door from a closed position preventing discharge of material from the container through the opening into the pit to an open position allowing discharge of the material into the pit by gravity to a bottom of the pit below the container opening;

providing for the pit an exterior opening outside the container;

providing an auger standing outside the container with an inclined auger tube extending downwardly from a top discharge end of the auger to a bottom feed end of the auger;

and inserting the inclined bottom feed end portion of the auger into the pit through the exterior opening so as to extend to the bottom of the pit for extracting the material falling into the pit through the container opening.

BRIEF DESCRIPTION OF THE DRAWINGS

One embodiment of the invention will now be described in conjunction with the accompanying drawings in which.

DETAILED DESCRIPTION

Figure 1:
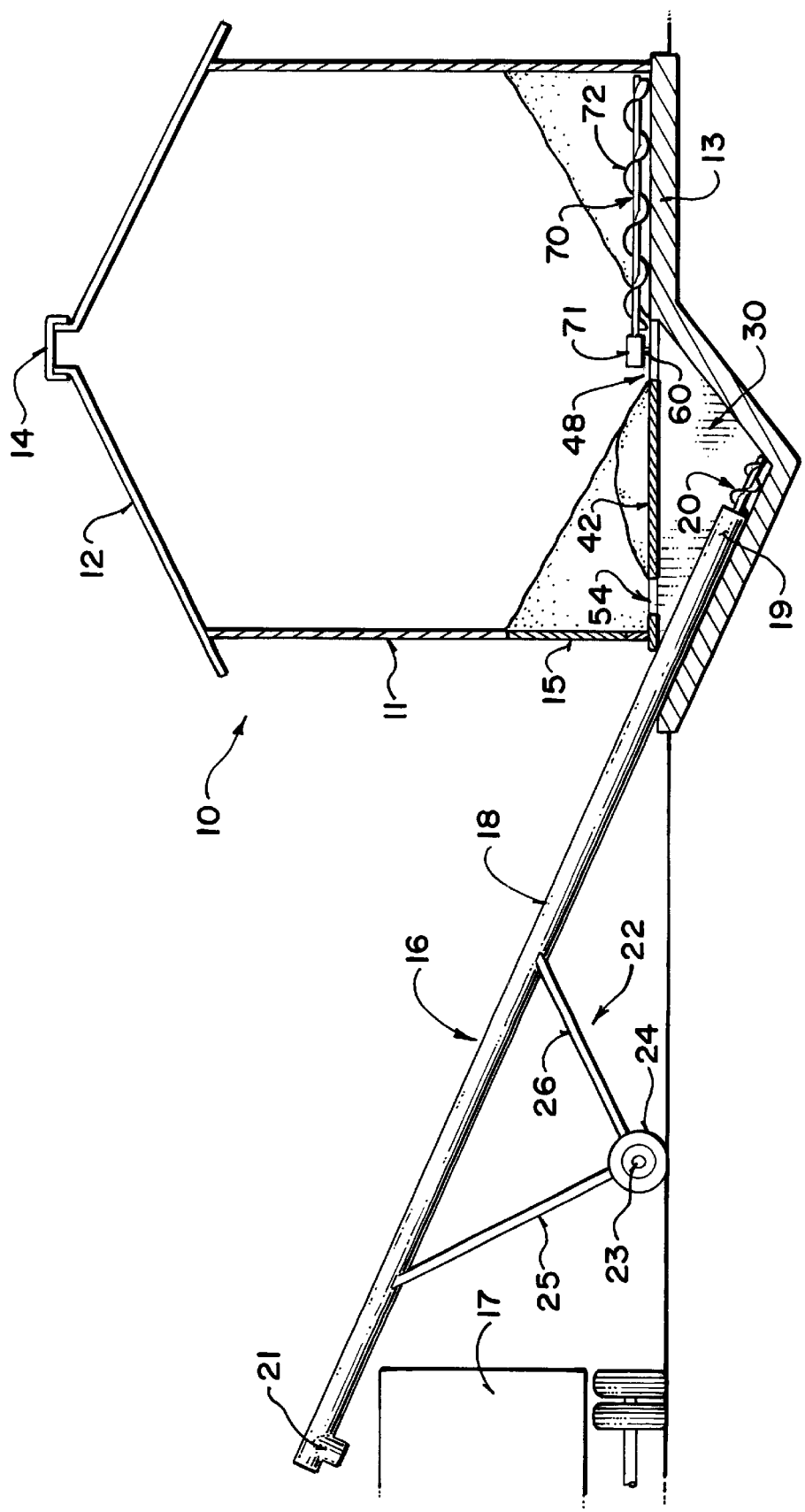
FIG. 1 is a vertical cross-sectional view though a crop material storage bin and the discharge system for emptying the bin.

A grain bin 10 includes a wall 11 and a roof 12 and stands on a horizontal concrete pad 13.

In the embodiment shown the wall 11 is of circular cylindrical shape and this is conventional and preferred although it is not essential to the invention. The roof 12 is conical converging upwardly to an apex 14 at which there is in many cases provided a filler opening by which the bin can be filled with crop material required for storage.

The wall 11 includes a door 15 at one side an adjacent the concrete pad so as to allow access into the bin by an operator.

The construction of the wall and its connection with the base pad are shown only schematically since these vary in accordance with the manufacturer of the bin and accordance with design requirements. It will be appreciated that the structure of the bin is conventional and can vary and does not perform an important part of the present invention.

The discharge system for the bin includes a conventional discharge auger 16 which operates to discharge crop material from the bin into a transport trailer 17. The trailer 17 and the auger 16 are of conventional construction and will not be described in detail. It suffice to say that the auger includes an inclined auger tube 18 extending from a feed end 19 at which an end portion 20 of the auger flight within the tube is exposed for extracting the crop material. A discharge spout 21 is provided at the upper end of the tube 18. The tube 18 is mounted on an under carriage support system 22 including an axle 23 mounted on ground wheels 24 and two suspension leg assemblies 25 and 26 which extend at an angle from the axle to the tube. The length and/or location of one of the leg assemblies 25, 26 can be adjusted so as to adjust the angle of the tube 18 to the ground.

The discharge system of the present invention further includes a pit 30 formed through the concrete pad 13 so as to extend downwardly into the ground below the concrete pad.

Figure 2:
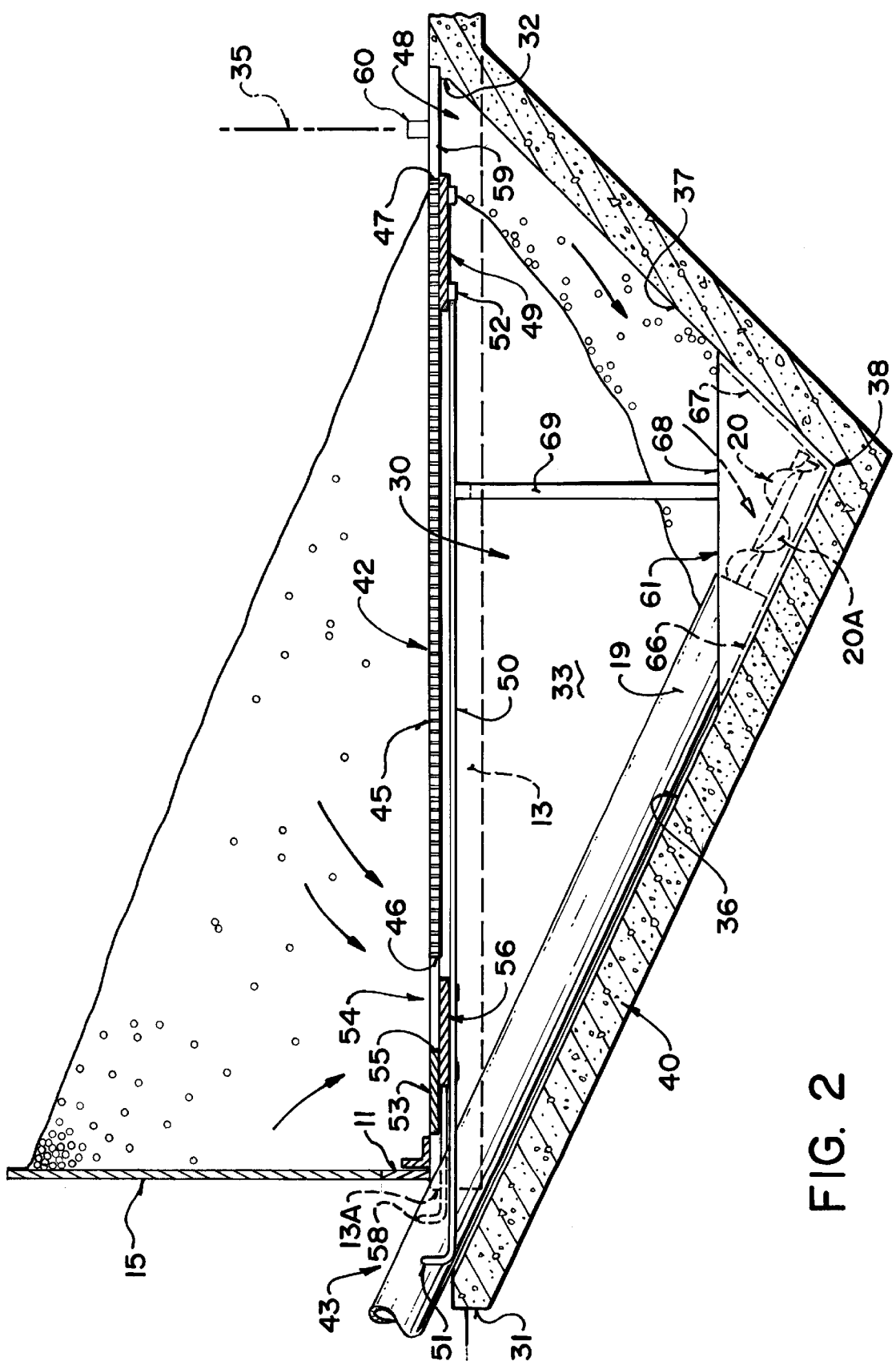
FIG. 2 is an enlarged view of the same cross-section as FIG. 1 showing further details of the pit and its cover.
Figure 3:
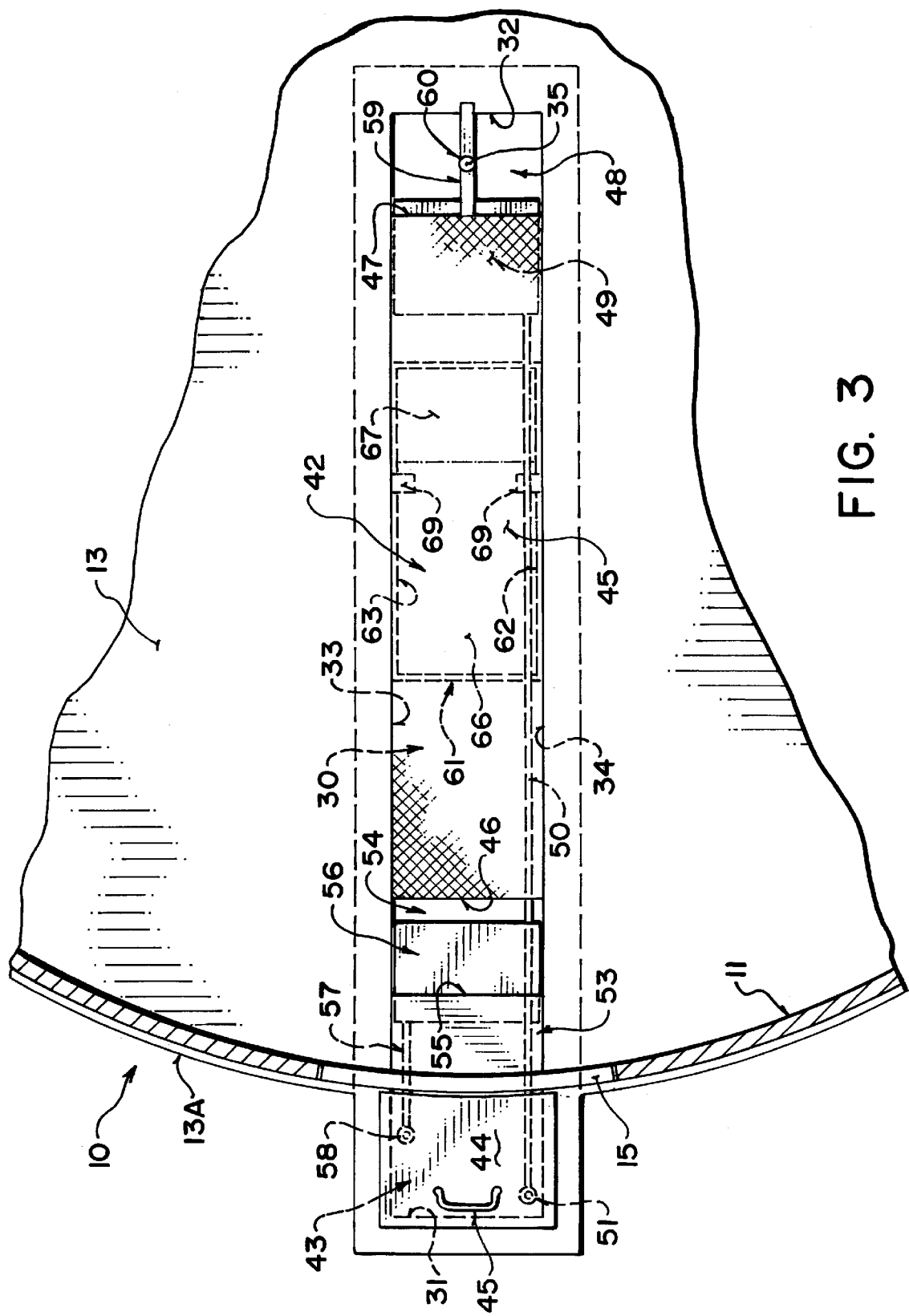
FIG. 3 is a top plan view of the components of FIG. 2.

The pit 30 as best shown in FIGS. 2 and 3 includes ends 31 and 32 together with sides 33 and 34. The end 32 is located slightly beyond a center 35 of the bin. The end 31 is located outside the wall 11 of the bin.

The pit further includes inclined bottom wall portions 36 and 37 which converge downwardly to an apex 38 immediate the ends at 31 and 32. Thus the pit is generally triangular in side elevation. The pit forms an opening at the surface of the concrete pad which is rectangular and elongate which is best shown in FIG. 3.

The pit is preferably formed during the casting of the base 13. In one arrangement, the pit is formed by concrete walls at the sides and ends and by concrete bottom walls underlying the bottom surfaces 36 and 37. Thus the pit is defined by a layer 40 of concrete which has a suitable thickness similar to the thickness of the concrete pad and is reinforced by suitable reinforcing similar to that of the concrete pad. Alternatively, a molded plastic body can be used to form the walls of the pit, with concrete cast partly of wholly around the body. Other shoring materials such as wood or sheet metal could also be used.

The pit is covered inside the bin by a cover plate 42 which extends over the full length of the pit so the pit can be effectively closed to prevent the escape of material from the bin into the pit. Thus when the cover plate is fully closed the crop material is stored within the bin in conventional manner on top of the surface of the pad 13 and on the top of the plate 42.

The pit extends to a position outside the wall 30 and forms a generally horizontal opening at or adjacent the surface of the ground just beyond the edge 13A of the pad 13. The opening is indicated at 43 and is covered by a cover panel 44 with a handle 45 so that the cover panel can be removed allowing access to the pit from the exterior of the bin. The opening and the cover are preferably inclined away from the wall to shed rain water.

The removable cover plate 42 includes a central section 45 extending from one end 46 to an opposite end 47 which is formed of a material which is closed to the passage of the crop material but is preferably perforated so as to allow escape of air upwardly into the bin from the bin if required. The panel 45 may however be fully closed, since its main intention is to prevent the penetration of the crop material into the pit over this area. The end 46 is spaced from the wall 11 and the end 47 is spaced from the center 35 toward the other end of the pit. Thus it will be appreciated that there is an opening 48 between the end 47 of the cover panel 45 and the end 32 of the pit which is just the beyond the center 35. The opening 48 can be closed by a sliding door 49 mounted on an underside of the panel 45 and movable in sliding action longitudinally of the pit from a fully closed position in which the door is moved to the right hand end butting the end 32 of the pit and thus fully closing the opening 48 to an open position which is retracted so as to underly the panel 45 leaving the opening 48 fully open. Adjustment to an intermediate position is also possible. The sliding door is actuated by a rod 50 which extends from the door 47 along the pit just underneath the panel 45 to a handle 51 exposed in the opening 43. The door is mounted on suitable slide guides 52 which are shown only schematically so as to hold it in place in both the open and closed position. The cover plate 42 further includes a short panel 53 located between the wall and a second opening 54 defined between an edge 55 of the panel 53 and the edge 46 of the panel 45.

The opening 54 is again controlled by a sliding door 56 similar in construction to the door 49. The door 56 is movable by a rod 57 having a handle 58 again exposed again at the opening 43. The handle 51 is on the one side of the opening 43 and the handle 58 on the other side of the opening thus making it clear to the user which handle is which for opening the central opening 48 or the side opening 54 as required. Again the door can be moved from a fully closed position to fully open position or can move to an intermediate position as shown in FIGS. 2 and 3.

A rod 59 bridges across the opening 48 and is mounted at one end on the edge 47 of the panel 45 and each other end on the edge 32 of the pit. The rod 59 carries a vertical pivot pin 60 mounted at the center 35 of the bin.

A hopper portion 61 is mounted in the pit at the bottom of the pit and includes side wall 62 and 63 each lying immediately adjacent a respective one of the side walls 33 and 34 of the pit together with bottom walls 66 and 67 lying immediately adjacent the bottom wall portions 36 and 37 respectively. Thus the hopper section is generally triangular extending to a top edge 68. The hopper includes a pair of handles 69 standing upwardly from the hopper to a position at the top of the pit so an operator removing the cover plate 42 can reach the handles and can lift out the hopper section manually.

In operation, the cover plate 42 is moved to its fully closed position for filling of the bin so that the bin is filled from the filling opening 14 so as to store the material inside the walls and on top of the upper surface of the pad 13 and the plate 42.

If required, some aeration of the material in the bin can be effected by injecting or blowing air through the opening 43 into the pit so that the air under pressure is forced through the perforated panel 45 and into the material stored in the bin. This can be used for full floor aeration by providing a raised floor which allows the air from the pit to spread over substantially the whole floor area, or by providing one or more channels in the floor to spread the air to different parts of the floor.

While storage is carried out, the panel 44 is maintained in a closed position fully closed in the opening 43 so that the pit remains closed and dry ready for use when the crop material is to be discharged.

When discharge is required the panel 44 is opened allowing open access to the opening 43. The lower feed end 19 including the lower portion of the flight exposed beyond the end 19 is then inserted into the pit through the opening 43. The angle of the bottom wall portion 36 is arranged so that it lies approximately along the angle of the auger tube so the auger tube lies against the bottom wall portion 36 in its sliding action into place at the bottom apex of the pit. The tube of the auger thus passes underneath the wall 11 and on top of the wall portion 36 into the pit until the guard bar 20A at the exposed flight portion 20 reaches the wall portion 37 thus allowing the auger flight to sit at the bottom apex 38.

The handles 51 and 58 are arranged so that the auger tube 19 passes between the handles and above the edge 31 of the pit. The handles are thus exposed and the operator after inserting the auger tube grasps the handle 51 and opens the door 49 thus allowing the crop material to pass through the opening 48 into the pit. The bottom wall portion 37 is arranged at an angle so that the crop material slides down the wall to the apex to engage the exposed portion of the auger so that the crop material can be carried out of the pit by operation of the auger for discharge into the transport trailer 17. The door 49 can be closed when a proportion of the crop material is discharged and the auger continued to operate until the pit is substantially emptied if it is required to maintain a part of the crop material in the bin and discharge only a part. If however it is intended to discharge the whole contents of the bin, the door 49 is maintained opened and the auger operated until the crop material is discharged to condition shown in FIG. 2 in which the top surface of the crop material forms a cone extending upwardly and outwardly to a height at the wall 11 which is dependant upon the reposed angle of the particular crop material concerned. This leaves a considerable quantity of the material in the bin when discharge at the center opening ceases.

At this time the handle 58 is operated so as to open the door 56, which is shown in partly opened condition in FIGS. 2 and 3, to expose the opening 54 thus allowing the crop material to fall through the opening 54 into the pit. Again, the angle of the wall portion is arranged so that the crop material falls downwardly to the apex material 38 allowing the crop material adjacent the opening 54 to be discharged. If this angle is insufficient, an inclined deflector plate (not shown) can be provided over the top of the auger to direct the material to the feed section of the auger.

The effect of the opening 54 is thus to clear a pathway in effect along the length of the pit, although some material may remain in the area between the openings 54 and 48.

This pathway thus exposes the door 50 allowing the door to be opened so that an operator can enter into the bin and walk along the line of the pit on top of the plate 42 carrying a conventional bin sweep 70. The bin sweep 70 includes a drive motor 71 and an auger flight section 72 and is arranged to be mounted on the vertical pivot pin 60. The sweep initially sits on top of the conical surfaces of the grain and acts to pull the grain or the crop material toward the central opening 48 so that the crop material is discharged through the central opening 48 and carried away by the auger. The bin sweep pulls the crop material inwardly and also moves angularly around the bin so as to complete sweeping of the material into the central opening and cleaning of the floor surface.

When the discharge is complete, an operator can enter the bin to sweep or remove any minor remaining amounts which can be swept into the pit for discharge by the auger. When the floor is fully cleaned, operation of the auger flight will extract most of the remaining material at the bottom of the pit. The auger flight can then be removed. Some remaining minor amounts of crop material will rest at the apex since these cannot be carried by the auger flight. The remaining crop material can thus be removed by pulling the hopper section from the bottom of the pit. In an alternative arrangement (not shown) the operator can enter the pit and can shovel the remaining crop material from the apex into a suitable container, for this purpose, the width of the pit is preferably the order of two feet to allow an operator to enter and to shovel.

While the bottom wall portions 36 and 37 are preferably inclined to a pointed apex, it would be appreciated that these walls do not necessarily have to converge to an apex since the material can be extracted from the pit by the auger flight. The most efficient arrangement thus provides the triangular shape of the pit so as to converge the material to the apex and thus minimize the amount of material which must be extracted manually. However other shapes of the bottom wall portions will allow the material to be removed provided the auger flight can be inserted but will increase the amount of material which needs to be shovelled and thus are disadvantageous.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A crop storage bin comprising:

a substantially horizontal floor pad defining a horizontal pad surface;

a bin wall arrangement mounted on the horizontal pad surface so as to stand upwardly therefrom and to define with the horizontal pad surface a container for a crop material;

a pit arranged below the pad surface into which crop material can fall from the horizontal pad surface;

the pit forming an elongate trough extending from a center of the floor pad to one side edge of the floor pad leaving a remainder of the horizontal floor pad on each side of the pit on which the crop material sits;

the pit having thereon a horizontal cover over the pit at the horizontal pad surface;

the horizontal cover of the pit having an opening therein adjacent the center of the horizontal floor pad for passage of crop material from the horizontal pad surface to the pit, the at least one opening having a door operable to be moveable from a closed position preventing discharge of material through the opening into the pit to an open position allowing discharge of the material into the pit by gravity to a bottom collection location of the pit below the opening;

the pit extending to a position beyond the bin wall at said one side edge of the horizontal floor pad so as to provide an exterior opening outside the bin wall;

the pit being shaped such that a straight line from the bottom collection location of the pit extending through the exterior opening extends to an exterior location outside the bin wall raised from the ground whereby the pit can cooperate with an auger standing outside the container with an inclined auger tube extending downwardly from a top discharge end of the auger at the exterior location to a bottom feed end of the auger at the bottom collection location of the pit.

2. The storage bin according to claim 1 wherein a bottom wall of the pit is inclined downwardly from the exterior opening to the bottom collection location of the pit.

3. The storage bin according to claim 2 wherein the pit is generally triangular in side elevational shape with a bottom apex at the bottom collection location and a second bottom wall portion which is inclined from the container opening downwardly and along the pit toward the exterior opening.

4. The storage bin according to claim 1 wherein the exterior opening is generally horizontal.

5. The storage bin according to claim 1 wherein the pit includes a removable hopper at a bottom apex for extraction of remaining crop material.

6. A crop storage bin comprising:

a substantially horizontal floor pad defining a horizontal pad surface;

a bin wall arrangement mounted on the horizontal pad surface so as to stand upwardly therefrom and to define with the horizontal pad surface a container for a crop material;

a pit arranged below the pad surface into which crop material can fall from the horizontal pad surface;

the pit extending from a center of the floor pad to one side edge of the floor pad leaving a remainder of the horizontal floor pad on each side of the pit;

the pit having a first opening into the pit adjacent the center of the horizontal floor pad for passage of crop material from the horizontal pad surface to the pit, the first opening having a door operable to be moveable from a closed position preventing discharge of material through the opening into the pit to an open position allowing discharge of the material into the pit by gravity to a bottom collection location of the pit below the opening;

the pit extending to a position beyond the bin wall at said one side edge of the horizontal floor pad so as to provide an exterior opening outside the bin wall;

the pit being shaped such that a straight line from the bottom collection location of the pit extending through the exterior opening extends to an exterior location outside the bin wall raised from the ground whereby the pit can cooperate with an auger standing outside the container with an inclined auger tube extending downwardly from a top discharge end of the auger at the exterior location to a bottom feed end of the auger at the bottom collection location of the pit;

and the pit having a second opening spaced along the pit adjacent the bin wall.

7. The storage bin according to claim 6 wherein each of the first and second openings includes a respective door separately operable to open and dose the opening.

8. The storage bin according to claim 6 wherein the bin wall includes an inlet door adjacent the second opening.

9. The storage bin according to claim 6 wherein the pit is covered between the first and second openings by a removable cover plate.

10. The storage bin according to claim 9 wherein the removable cover plate is perforated to allow passage of air from the pit into the crop material.

11. A method for unloading crop material from a storage bin comprising:

providing a crop storage bin;

providing for the crop storage bin a substantially horizontal floor pad defining a horizontal pad surface;

providing for the crop storage bin a bin wall arrangement mounted on the pad so as to stand upwardly therefrom and to define with the horizontal pad surface a container for a crop material;

providing a pit arranged below the horizontal pad surface into which crop material can fall from the horizontal pad surface;

forming the pit as an elongate trough extending from a center of the floor pad to one side edge of the floor pad leaving a remainder of the horizontal floor pad on each side of the pit on which the crop material sits;

providing a horizontal cover over the pit at the horizontal floor pad with at least one opening in the horizontal cover for material to fall from the horizontal floor pad into the pit;

opening a door from a closed position preventing discharge of material through the opening in the horizontal cover into the pit to an open position allowing discharge of the material into the pit by gravity to a bottom of the pit below the opening in the horizontal cover;

providing the pit so as to extend to a position beyond the bin wall at said one side edge of the horizontal floor pad so as to provide for the pit an exterior opening outside the bin wall;

providing an auger on an undercarriage support standing on the ground outside the bin wall with an inclined auger tube extending downwardly from a top discharge end of the auger to a bottom feed end of the auger, the undercarriage support being adjustable so as to adjust an angle of inclination the inclined auger tube relative to the horizontal;

inserting the bottom feed end portion of the inclined auger tube into the pit through the exterior opening at a selected angle of inclination so as to extend to the bottom of the pit for extracting the material falling into the pit through the opening in the horizontal cover for transport by the auger to the top discharge end at a position spaced from the ground for discharge downwardly into a receptacle;

and subsequently removing the auger from the pit for use at another storage bin.

12. The method according to claim 11 wherein a bottom wall of the pit is inclined downwardly from the exterior opening to the bottom of the pit.

13. The method according to claim 12 wherein the bottom wall is inclined at an angle approximately equal to the selected angle of inclination of the auger.

14. The method according to claim 12 wherein the pit is generally triangular in side elevational shape with a bottom apex such that a second bottom wall portion is inclined from the opening in the horizontal cover downwardly and along the pit toward the exterior opening.

15. The method according to claim 11 wherein the step of providing an opening in the horizontal cover includes providing a first opening in the horizontal cover adjacent a center of the bin and providing a second opening in the horizontal cover adjacent the wall and wherein the door of the first opening is opened first and the door of the second opening is opened when the first opening stops flowing to clear a path toward the wall and wherein the bin wall includes an inlet door adjacent the second opening which is opened and a bin sweep inserted through the inlet door.

16. The method according to claim 11 wherein the horizontal cover comprises a removable cover plate.

17. The method according to claim 16 wherein the removable cover plate is perforated to allow passage of air from the pit into the crop material.

18. The method according to claim 11 wherein the pit includes a removable hopper at a bottom apex of the pit for extraction of remaining crop material.

* * * * *